(12) United States Patent
Yokota

(10) Patent No.: US 7,310,690 B2
(45) Date of Patent: Dec. 18, 2007

(54) COMMUNICATION DEVICE SELECTING ITS OWN UNIQUE NAME BY COMPARING WITH OTHER NAMES FROM OTHER COMMUNICATION DEVICES ON A NETWORK

(75) Inventor: Akane Yokota, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 746 days.

(21) Appl. No.: 10/405,215

(22) Filed: Apr. 3, 2003

(65) Prior Publication Data

US 2003/0195985 A1 Oct. 16, 2003

(30) Foreign Application Priority Data

Apr. 11, 2002 (JP) ............................. 2002-109441

(51) Int. Cl.
*G06F 3/00* (2006.01)
(52) U.S. Cl. ............................................ 710/9; 710/10
(58) Field of Classification Search ........ 709/220–222, 709/245, 223, 227, 219; 358/1.13; 707/200; 710/3, 8–10
See application file for complete search history.

(56) References Cited

U.S. PATENT DOCUMENTS

| | | | | |
|---|---|---|---|---|
| 5,623,666 A * | 4/1997 | Pike et al. | ................... | 707/200 |
| 5,845,078 A * | 12/1998 | Tezuka et al. | ............... | 709/222 |
| 6,047,332 A * | 4/2000 | Viswanathan et al. | ...... | 709/245 |
| 6,128,661 A * | 10/2000 | Flanagin et al. | ............ | 709/227 |
| 2001/0014911 A1 | 8/2001 | Doi et al. | ................... | 709/221 |
| 2002/0112058 A1 * | 8/2002 | Weisman et al. | ........... | 709/227 |
| 2002/0133573 A1 * | 9/2002 | Matsuda et al. | ............ | 709/220 |
| 2003/0005100 A1 * | 1/2003 | Barnard et al. | ............. | 709/223 |
| 2003/0011801 A1 * | 1/2003 | Simpson et al. | ........... | 358/1.13 |
| 2003/0131073 A1 * | 7/2003 | Lucovsky et al. | .......... | 709/219 |

FOREIGN PATENT DOCUMENTS

| | | |
|---|---|---|
| EP | 1 001 584 A2 | 5/2000 |
| JP | 03-135130 | 6/1991 |
| JP | 06-319176 | 11/1994 |
| JP | 08-156371 | 6/1996 |
| JP | 11-282782 | 10/1999 |

OTHER PUBLICATIONS

Ryan Troll, "Automatically Choosing an IP Address in an Ad-Hoc IPv4 Network," IETF Draft, Mar. 2, 2000, XP002233471.
Apr. 13, 2006 Search Report in European Patent Appln. 03252049.

* cited by examiner

*Primary Examiner*—Le Hien Luu
(74) *Attorney, Agent, or Firm*—Fitzpatrick, Cella, Harper & Scinto

(57) ABSTRACT

Disclosed are a communication device and a method of controlling the same, whereby it is possible to change the device name independently in such a manner that a plurality of communication devices having the same name will not exist on the same wireless communication network. The communication device queries another device with regard to its name and determines whether its own name and the name of the other device are the same. If the two names are the same, the querying communication device generates a name different from that of the other device using, e.g., its own wireless communication address, thereby changing its name. As a result, even if new devices are added to the network, the querying communication device automatically assigns to itself a name that is always different from those of these other devices.

15 Claims, 14 Drawing Sheets

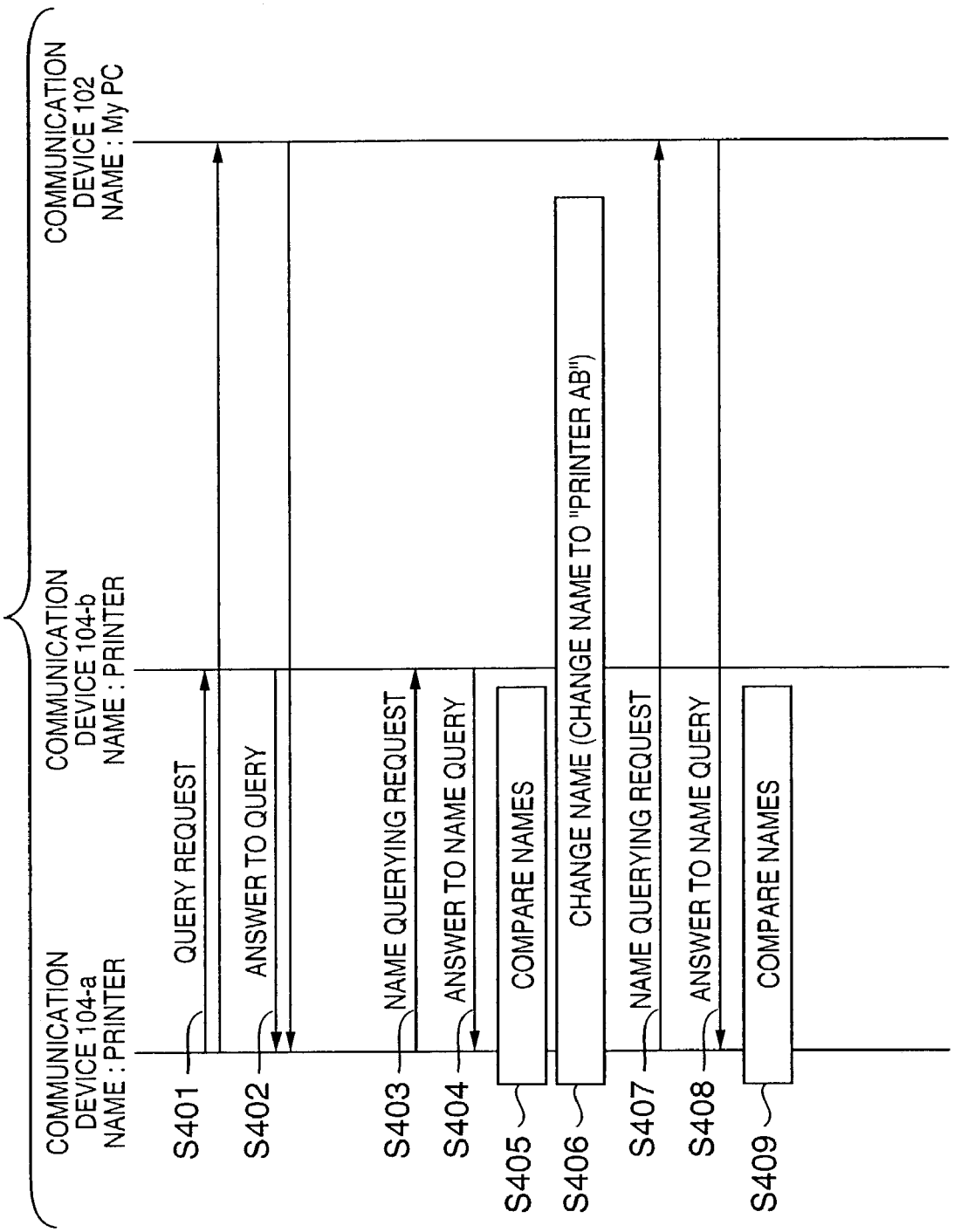

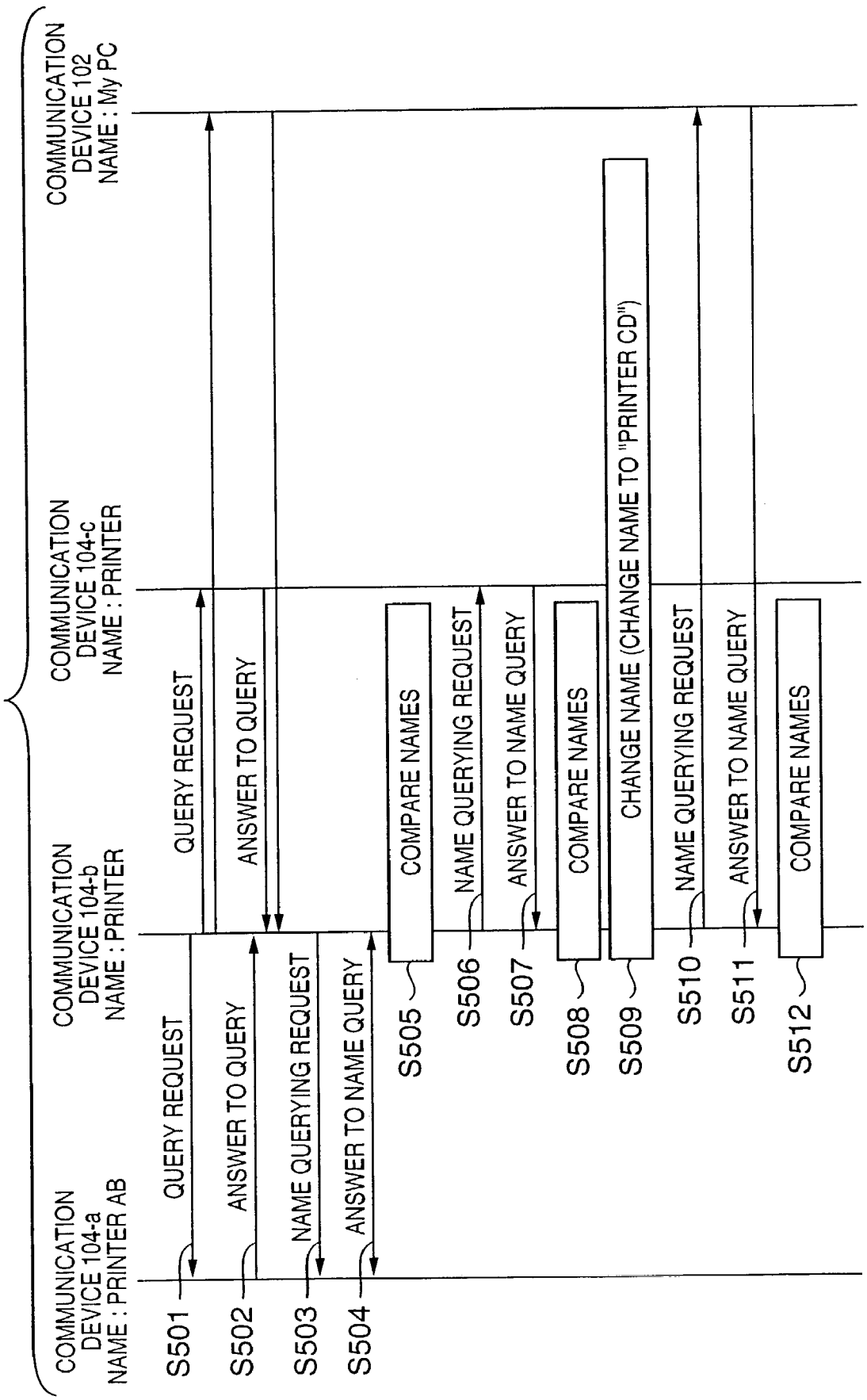

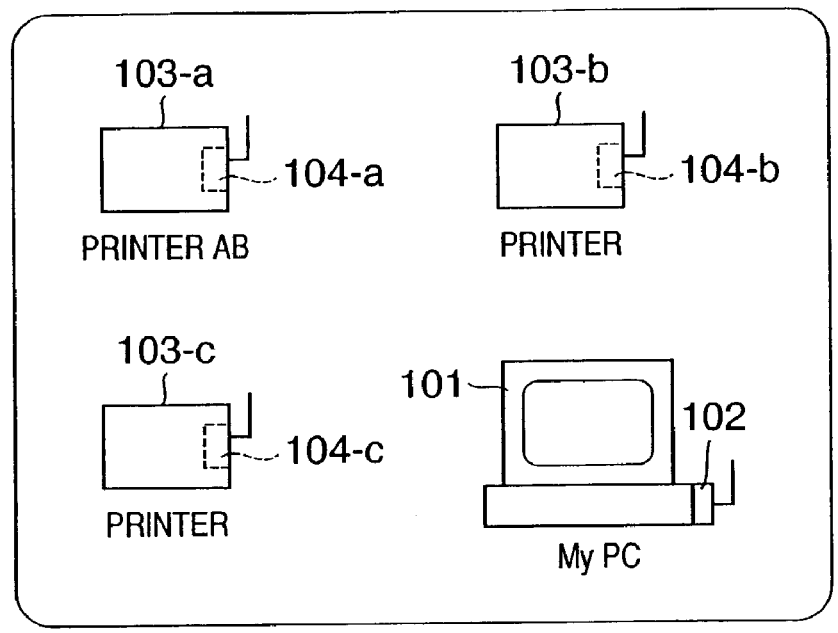
F I G. 7A
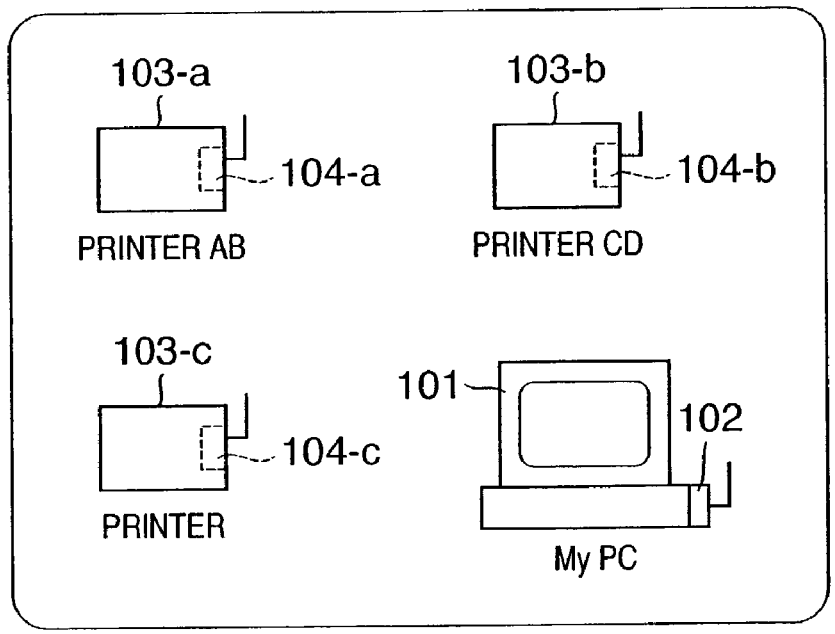
F I G. 7B

FIG. 9

PRINTER

WIRELESS PRINTER

WIRELESS-PRINTER

WIRELESS COMMUNICATION PRINTER

WIRELESS COMMUNICATION-PRINTER

COMMUNICATION DEVICE SELECTING ITS OWN UNIQUE NAME BY COMPARING WITH OTHER NAMES FROM OTHER COMMUNICATION DEVICES ON A NETWORK

FIELD OF THE INVENTION

This invention relates to a communication device and a method of controlling the same. More particularly, the invention relates to a communication device having a name used on a communication network and to a method of controlling this device.

BACKGROUND OF THE INVENTION

In communication using TCP/IP, a communication device is capable of possessing an IP address having a unique value for each device, and a name, which is for expressing the device, corresponding to the IP address. The IP address and the name of the device corresponding to this address are managed by a domain name server so that the same device name will not appear in duplicate on the same network. By using the device name, therefore, a user of the network is capable of accessing a specific communication device in the network.

According to the specifications of short-distance wireless communication, it is possible for a device that is used in order to connect to a short-distance wireless communication network to have a name for expressing the device in addition to a unique address. However, a short-distance wireless communication network is temporary and there are cases where there is no arrangement for managing device names collectively as in the manner of a domain name server. Communications equipment using such a short-distance wireless communication system often is assigned a device name beforehand by the manufacturer of the equipment and the name is recorded within the device.

In a case where a device name has been pre-assigned at the time of manufacture, the same device names are assigned as an initial value to communication devices having the same format. If the communication device is one having input means, it is possible to use the input means to change the name that has been set as the initial value. However, equipment such as printers, scanners, digital still cameras and digital video cameras often do not have input means capable of changing a name that has been set as an initial value. In a case where a communication device is connected to such equipment internally or externally and wireless communication is performed between such pieces of equipment, the user must identify the equipment by the previously set device name.

For example, if a plurality of printers of the same model each internally incorporating a communication device having the name "PRINTER" exist on the same short-distance wireless communication network, the user cannot access a specific printer by the name "PRINTER". Such a system is inconvenient.

SUMMARY OF THE INVENTION

Accordingly, an object of the present invention is to provide a communication device and a method of controlling the same, whereby it is possible to change the device name independently in such a manner that a plurality of communication devices having the same name will not exist on the same communication network.

According to an aspect of the invention, a communication device having a name used on a communication network, comprising name acquisition means for acquiring a name from another communication device; comparison means for comparing the name of this communication device with the acquired name of the other communication device; and control means for changing, in accordance with the result of the comparison, either the name of this communication device or the name of the other communication device so that the names of the communication devices are different from each other.

According to another aspect of the present invention, a method of controlling a communication device having a name used on a communication network, comprising a name acquisition step of acquiring a name from another communication device; a comparison step of comparing the name of this communication device with the acquired name of the other communication device; and a control step of changing, in accordance with the result of the comparison, either the name of this communication device or the name of the other communication device so that the names of the communication devices are different from each other.

According to another aspect of the present invention, a computer program for causing a computer to execute the method of controlling a communication device of the present invention and a computer-readable storage medium storing this computer program can also realize the above-described and another objects of the invention.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 5 is a sequence diagram illustrating the gist of name-change processing shown in FIG. 4;

FIG. 6 is a sequence diagram illustrating a case where a communication device (104-*b*) in the first embodiment executes name-change processing in the short-distance wireless communication network the state of which is shown in FIG. 7A;

FIG. 7A is a diagram illustrating a state in which a printing apparatus (103-*c*) has been added to the short-distance wireless communication network in the state shown in FIG. 1B, and FIG. 7B is a diagram illustrating a state that prevails after the processing of FIG. 6 has been executed in the state depicted in FIG. 7A;

FIG. 9 is a diagram illustrating an example of a list of names usable in separate name generating processing;

DESCRIPTION OF THE PREFERRED EMBODIMENTS

Preferred embodiments of the present invention will now be described in detail in accordance with the accompanying drawings.

Figure 1A:
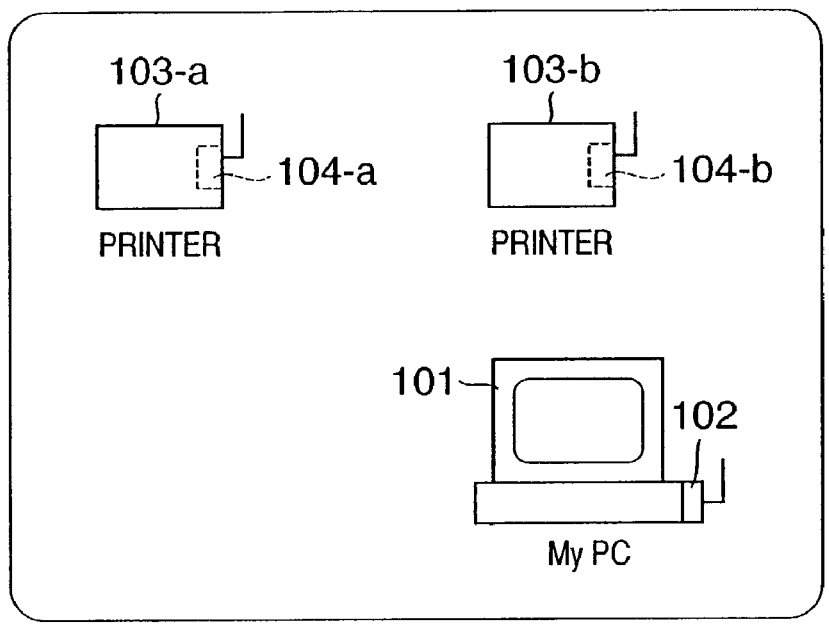
FIG. 1A is a diagram illustrating an example of the overall configuration of a short-distance wireless communication network according to a first embodiment of the present invention.
Figure 1B:
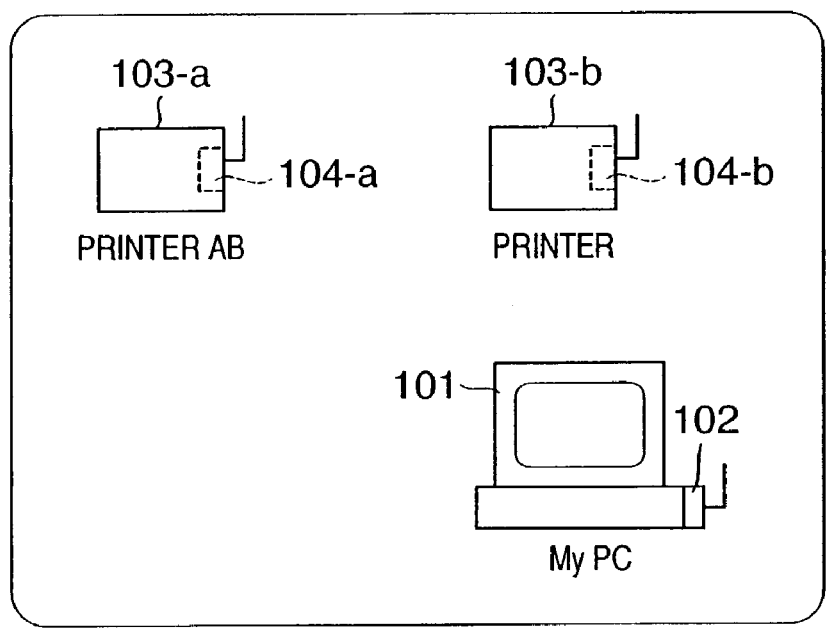
FIG. 1B is a diagram illustrating an example of the state that prevails after a printer (103-*a*) has executed name-change processing in the first embodiment of FIG. 1A.

FIGS. 1A, 1B are diagrams illustrating an example of the overall configuration of a short-distance wireless communication network constructed using a communication device according to a first embodiment of the present invention. A communication device 102 for wireless communication is connected to a computer 101. It will be assumed here that the device name of the communication device 102 has been changed from an initial value by input means (a keyboard and mouse, etc., which are not shown) of the computer 101 and that the "My PC" device name has been set. Printing apparatus 103-a, 103-b (referred to generically as printing apparatus 103) internally incorporate communication devices 104a, 104b (referred to collectively as a communication device 104 below), respectively. Further, it is assumed that the printing apparatus 103 does not possess input means for changing the device name of the communication device 104, and that the communication device 104 executes communication processing using the device name "PRINTER", which is the initial value of the name.

In the state prevailing in FIG. 1A, the computer 101 sees that the short-distance wireless communication network includes "My PC" and two printing apparatus each having the name "PRINTER". It should be noted that the computer 101 and the printing apparatus 103 are linked by short-distance wireless communication using the communication devices 102 and 104 and are capable of sending and receiving commands and print images.

Figure 2:
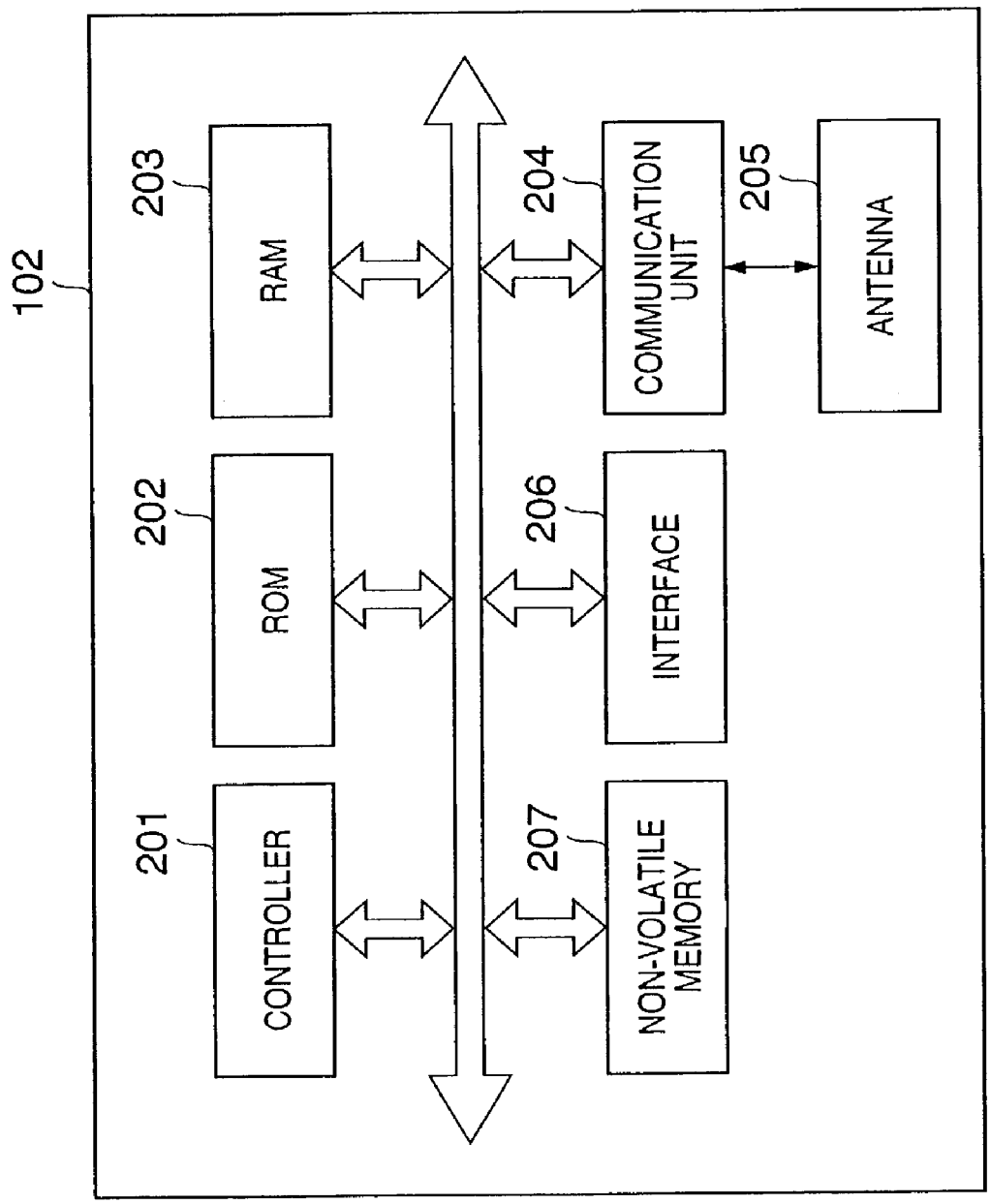
FIG. 2 is a block diagram illustrating an example of the internal structure of a communication device according to the first embodiment.

FIG. 2 is a block diagram illustrating the internal structure of the communication device 102. As shown in FIG. 2, the communication device 102 includes a controller 201 such as a CPU, a ROM 202, a RAM 203, a communication unit 204, an antenna 205, an interface 206 and a non-volatile memory 207. The controller 201 controls the overall communication device 102. The ROM 202 stores constants, variables and programs for operating the controller 201, and the RAM 203 is used as the working area of the controller 201. The name of the communication device and data such as a device-specific address used in communication are stored in the non-volatile memory 207. The communication unit 204 and antenna 205 perform device-to-device communication by short-distance wireless communication. The interface 206 is used to connect to another apparatus (the computer 101 in the case of this embodiment).

Figure 3:
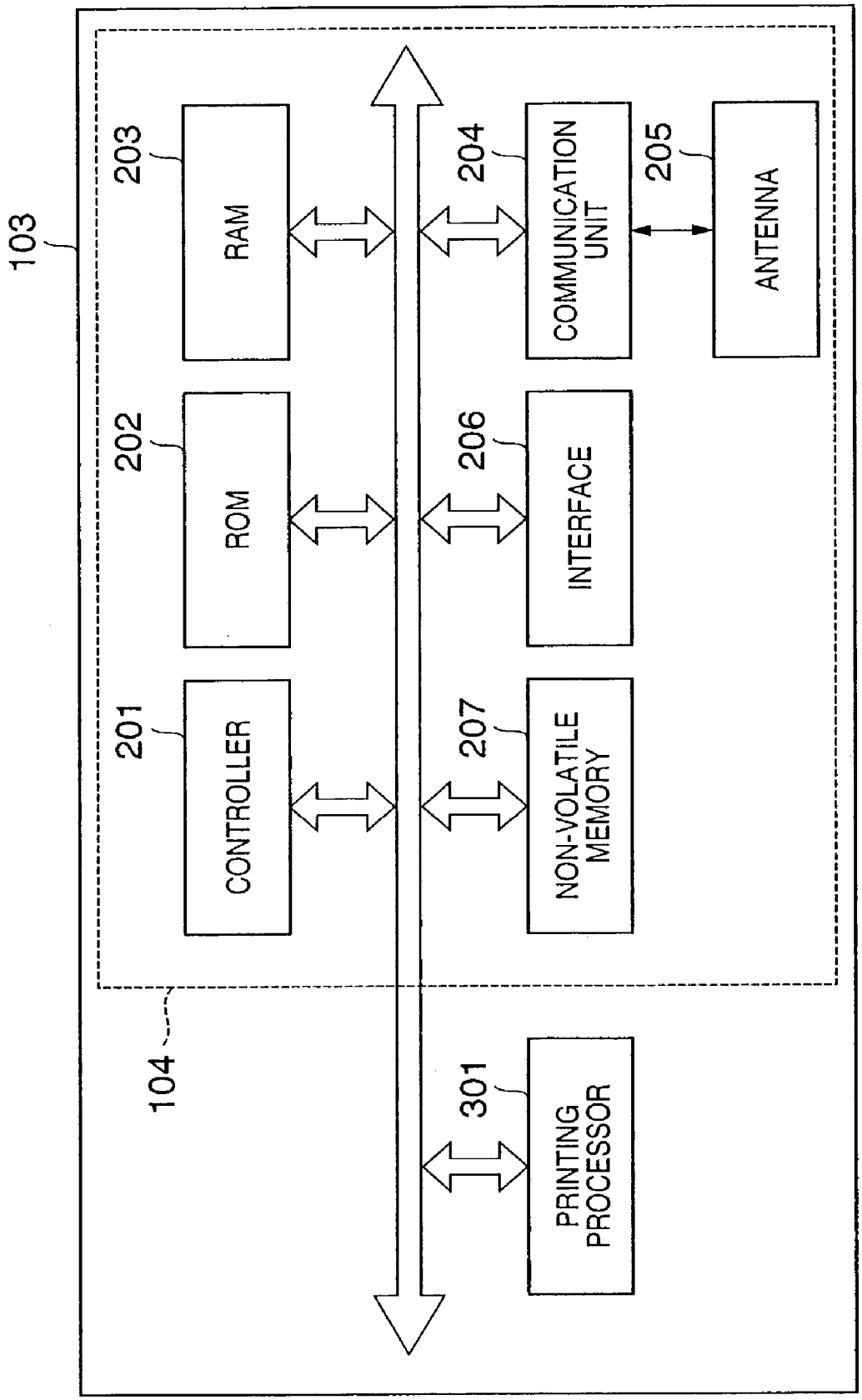
FIG. 3 is a block diagram illustrating an example of the internal structure of a printing apparatus according to the first embodiment.

FIG. 3 is a block diagram illustrating the internal structure of the printing apparatus 103. As will be apparent from a comparison of FIG. 3 with FIG. 2, the printing apparatus 103 is constituted by the communication device 104, which has a structure identical with that of the communication device 102, and a printing processor 301. Accordingly, the components internally of the communication device 104 are designated by reference characters identical with those shown in FIG. 2 and need not be described again. The printing processor 301 is used in printing print data transmitted from the computer 101 via the communication device 102, and in printing the device name after a change.

Figure 4:
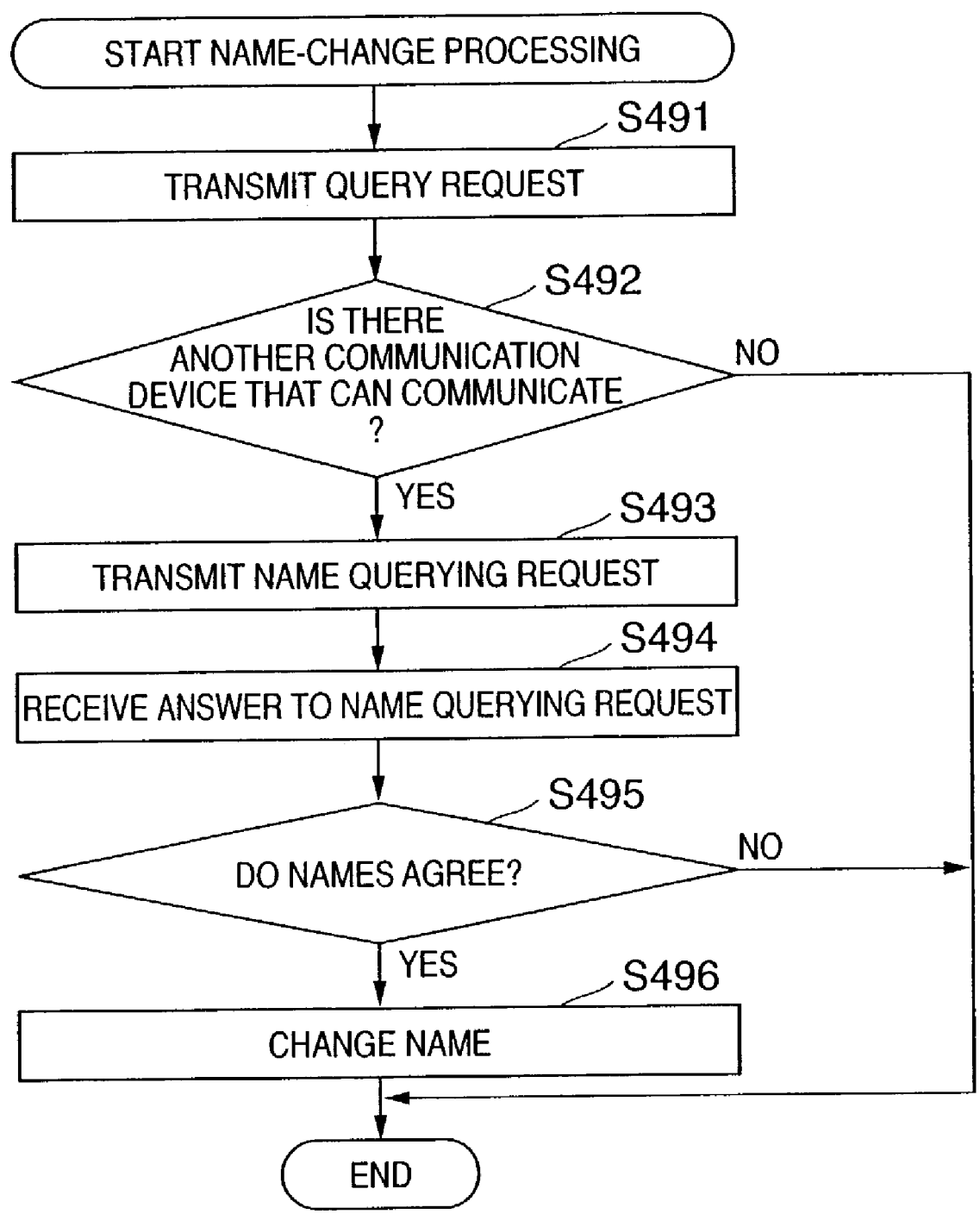
FIG. 4 is a flowchart illustrating name-change processing executed by the communication device according to the first embodiment.

FIG. 4 is a flowchart illustrating name-change processing executed by the communication device 102 or 104. Name-change processing is implemented by having a CPU (not shown) within the controller 201 execute a program, which has been stored in the ROM 203, for performing an operation corresponding to the flowchart shown in FIG. 4.

In a case where the communication device 102 or 104 executes name-change processing, the communication device sends the short-distance wireless communication network a query request inquiring as to whether there are other communication devices with which it can communicate in the vicinity (step S491). If the result of the inquiry is a decision that there is no other such communication device, as when a response is not received in a predetermined period of time, then the communication device 102 or 104 terminates name-change processing by reason of the fact that its device name is duplicated by that of another device (step S492).

On the other hand, if the communication device 102 or 104 determines at step S492 that another communication device with which it can communicate exists, then the communication device 102 or 104 transmits a name querying request to this other communication device (step S493). If a name-query answer, which includes the name of this other communication device, is received (step S494), then the communication device 102 or 104 compares its own device name with the device name of the other communication device (step S495). If the result of the comparison is that two names do not agree, processing is terminated. If the two names agree, on the other hand, then the communication device 102 or 104 changes its own device name (step S496), as will be described below, and then terminates processing. In should be noted that if a plurality of communication devices exist on the same short-distance wireless communication network, then the processing of steps S493 to S496 is repeated successively also with regard to the other communication devices so that the name of the communication device 102 or 104 is changed in such a manner that identical names will not be duplicated on the network.

FIG. 5 is a sequence diagram illustrating the gist of name-change processing in a case where the three communication devices 102, 104-a, 104-b shown in FIG. 1A exist on the same short-distance wireless communication network. FIG. 5 will be described taking as an example a case where the communication device 104-a executes name-change processing.

In a case where the communication device 104-a executes name-change processing, it sends the short-distance wireless communication network a query request inquiring as to whether there are other communication devices with which it can communicate in the vicinity (ordinarily within the same short-distance wireless communication network) (step S401). Upon receiving the query request, the communication devices 102 and 104-*b* transmit query answers to the communication device 104-*a* (step S402).

Upon receiving the query answers from the communication devices 102 and 104-*b*, the communication device 104-*a* transmits a name querying request first to the communication device 104-*b*, by way of example (step S403). Upon receiving the name querying request, the communication device 104-*b* transmits a name query answer, in which the name ("PRINTER") assigned to this communication device has been included, to the communication device 104-*a* (step S404).

Upon receiving the name query answer from the communication device 104-*b*, the communication device 104-*a* compares the name included in this answer with the name that has been assigned to itself (step S405). Since the name of the communication device 104-*a* is "PRINTER" and the name of the communication device 104-*b* also is "PRINTER", the result of the comparison at step S405 is that the two names agree. In accordance with a name generating method described later, therefore, the communication device 104-*a* executes processing to change its own device name and store the name after the change (step S406). Here it is assumed that the communication device 104-*a* changes its own device name to "PRINTER AB".

Next, the communication device 104-*a* transmits a name querying request to the communication device 102 that transmitted the query answer (step S407). Upon receiving the name querying request, the communication device 102 attaches the name that has been assigned to it to a name query answer and then transmits this answer to the communication device 104-*a* (step S408). In the case of this embodiment, the name of the communication device 102 is "My PC", and therefore "My PC" is transmitted as the answer to the name query.

Upon receiving the answer to the name query, the communication device 104-*a* compares the name included in this answer with the name that has been assigned to itself (step S409). Since the name of the communication device 104-*a* at this time is "PRINTER AB" and the name of the communication device 102 is "My PC", the result of the comparison is that the two names do not agree. Accordingly, the communication device 104-*a* does not change its own device name.

FIG. 1B illustrates the overall configuration of the short-distance wireless communication network of this embodiment after the processing of FIG. 5 has been completed.

In FIG. 1B, the user of the short-distance wireless communication network (e.g., the user of computer 101) can ascertain that this short-distance wireless communication network includes, in addition to "My PC", a printing apparatus having the name "PRINTER AB" and a printing apparatus having the name "PRINTER". Thus, the user can distinguish between the two printers.

The name-change processing described with reference to FIGS. 4 and 5 is subsequently executed also by the communication device 104-*b* incorporated within the printing apparatus 103-*b* and by the communication device 102 connected to the computer 101. However, since communication devices having the same name do not exist on the same short-distance wireless communication network, the communication device 104-*b* and communication device 102 do not change their names.

Next, reference will be had to FIG. 6 and FIGS. 7A, 7B to describe processing for when a printing apparatus 103-*c* has been added to the short-distance wireless communication network that prevails after the processing of FIG. 5 has been executed (namely the network shown in FIG. 1B). It will be assumed that a communication device 104-*c*, which has the name "PRINTER", has been incorporated within the printing apparatus 103-*c*.

FIG. 7A illustrates the state that prevails immediately after the printing apparatus 103-*c* has been added to the short-distance wireless communication network depicted in FIG. 1B. The user of this short-distance wireless communication network (e.g., the user of the computer 101) sees that the short-distance wireless communication network includes two printing apparatus each having the name "PRINTER", in addition to "PRINTER AB" and "My PC".

FIG. 6 is a sequence diagram for a case where the communication device 104-*b* executes name-change processing in the short-distance wireless communication network shown in FIG. 7A.

In a case where the communication device 104-*b* executes name-change processing, it transmits a query request inquiring as to whether there are other communication devices with which it can communicate in the vicinity (step S501). Upon receiving the query request, the communication devices (102, 104-*a*, 104-*b*) transmit query answers to the communication device 104-*b* (step S502).

Upon receiving the query answers from the other communication devices, the communication device 104-*b* transmits a name querying request first to the communication device 104-*a* (step S503). Upon receiving the name querying request, the communication device 104-*a* transmits a name query answer, in which the name ("PRINTER AB") of this communication device has been included, to the communication device 104-*b* (step S504).

Upon receiving the answer to the name query, the communication device 104-*b* compares the name included in this answer with the name that has been assigned to itself (step S505). Since the name of the communication device 104-*b* is "PRINTER" and the name of the communication device 104-*a* is "PRINTER AB", the result of the comparison is that the two names do not agree. Accordingly, the communication device 104-*b* does not change its own device name.

Next, the communication device 104-*b* transmits a name querying request to the communication device 104-*c* (step S506). Upon receiving the name querying request, the communication device 104-*c* transmits a query answer, in which the name ("PRINTER") of this communication device has been included, to the communication device 104-*b* (step S507).

Upon receiving the name query answer, the communication device 104-*b* compares the name included in this answer with the name that has been assigned to itself (step S508). Since the name of the communication device 104-*b* is "PRINTER", the result of the comparison at step S508 is that the two names agree. In accordance with a name generating method described later, therefore, the communication device 104-*b* executes processing to change its own device name and store the name after the change (step S509). Here it is assumed that the communication device 104-*b* changes its own device name to "PRINTER CD".

Next, the communication device 104-*b* transmits a name querying request to the communication device 102 (step S510). Upon receiving the name querying request, the communication device 102 transmits a query answer, in which the name "My PC" of this communication device has been included, to the communication device 104-*b* (step S511).

Upon receiving the answer to name query, the communication device 104-*b* compares the name included in this answer with the name that has been assigned to itself (step S512). Since the name of the communication device 104-*b* is "PRINTER AB" and the name of the communication device 102 is "My PC", the result of the comparison is that the two names do not agree. Accordingly, the communication device 104-*b* does not change its own device name.

FIG. 7B illustrates the configuration of the same short-distance wireless communication network after the processing of FIG. 6 has been completed. The names of the communication devices 104-*a*, 104-*b* and 104-*c* are "PRINTER AB", "PRINTER CD" and "PRINTER", respectively, so that the communication devices constituting the same short-distance wireless communication network all have names that differ from one another. Accordingly, as seen from the computer 101, the devices connected to the short-distance wireless communication network are the three printing apparatus (103-*a*, 103-*b*, 103-*c*) having names that differ from one another. As a result, it is possible to distinguish among these printers and, hence, makes it more convenient for the user to employ the network.

The timing at which the name-change processing of FIGS. 5 and 6 is executed can be set at will. For example, it is possible for the processing to be executed when power is introduced to a communication device. Further, a communication device may measure time using an internal clock signal or calendar, etc., and may execute the name-change processing whenever a prescribed period of time elapses following the last execution of name-change processing. In a case where the local communication device is linked wirelessly to another communication device at this time, the communication device may put execution of processing on hold until the link is terminated or attempt to re-execute processing at prescribed time intervals. Furthermore, when a name is changed, this may be carried out in order to verify that the name after the change will not duplicate the names of other devices.

In this embodiment, the communication device 104 compares its own device name with the device name of the other communication device whenever a name-query answer is received. Alternatively, the communication device 104 may transmit name querying requests to all other communication devices that replied to a query request and compare its own device name with the device names of the other communication devices when all name query answers to the name querying requests are received.

A method of generating a name when a name is to be changed will be described next.

In addition to their names, the communication devices 102 and 104 possess addresses that are capable of uniquely specifying the communication devices as in the manner of a MAC (Media Access Control) address or communication address used on a short-distance wireless communication network. Accordingly, by generating a name after a change using such an address, it is possible to generate a name that is different from that of other devices.

Figure 8:
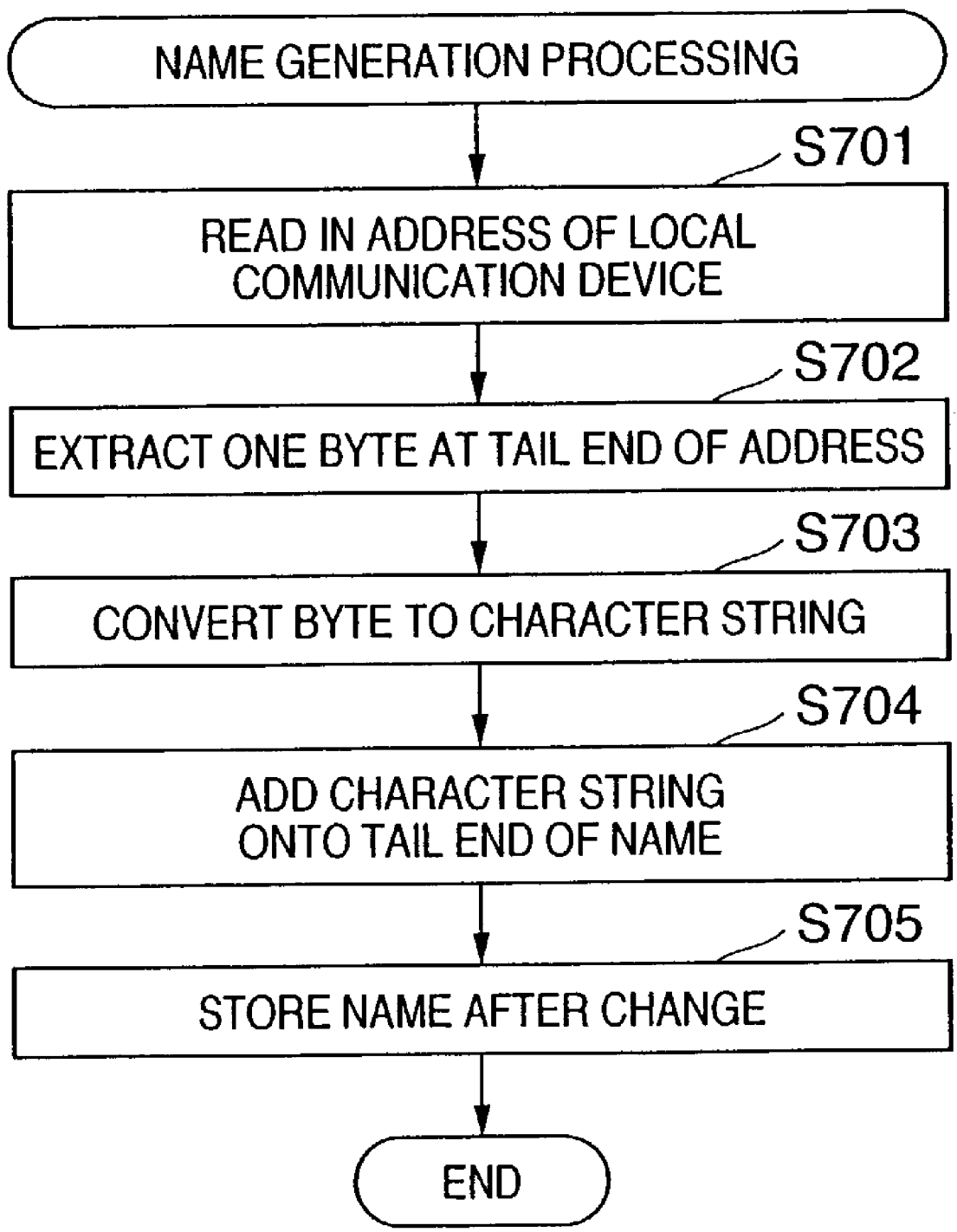
FIG. 8 is a flowchart illustrating processing for generating a name after a change in the communication device according to the first embodiment.

FIG. 8 is a flowchart illustrating processing for generating a changed name from a unique address possessed by the local communication device. FIG. 8 will be described in the case of the communication device 104-*a* having the name "PRINTER" and a unique address of, e.g., "0x01, 0x23, 0x45, 0x67, 0x89, 0xAB" in hexadecimal notation.

In a case where the communication device 104-*a* is currently executing name-change processing and is notified by another device that this other device has a name identical with the present name of the communication device 104-*a*, the controller 201 reads in the unique address of this communication device 104-*a* from the non-volatile memory 207 (step S701), extracts the value of the final single byte (0xAB) of this address (step S702), converts this value to a character string ("AB") (step S703) and adds this character string onto the end of the name ("PRINTER") of this communication device (step S704). As a result, the name of the communication device 104-*a* after the change becomes "PRINTER AB".

A character such as "-" (hyphen), "_" (underscore) or " " (space) may be inserted between the original name and the character string added onto the end thereof. The name after the change in such case will be "PRINTER-AB", "PRINTER_AB" or "PRINTER AB".

Here the method described is such that the value of the final byte of the device-specific address is converted to a character string and the character string is added onto the end of the name. However, if the length of the value added on does not exceed the length (six bytes in this case) of the unique address, any length may be used. If even after the device name is changed to "PRINTER AB" the name still agrees with the name of another communication device, the change may be made in such a manner that the values of the last two bytes of the unique address of the communication device 104-*a* are used. In this case, the name of the communication device 104-*a* after the change will be "PRINTER 89AB". Further, values used are not limited to those at the end of the unique address.

Another method of generating a name for change is to store a list of usable names within a communication device beforehand and select a new name from the list. An example of such a list of names is shown in FIG. 9. In a case where a communication device is to change its name, the communication device refers to the name list stored in, e.g., the non-volatile memory 207 and uses the name listed immediately following the name presently being used as the name of this communication device. Accordingly, in a case where a communication device having the name "PRINTER" changes its name, the name after the change becomes "WIRELESS PRINTER".

In this case, the communication device executes name-change processing again after the name is changed, checks to determine that the name after the change is not being used by another device and, if the name is already being used by another device, uses the next name in the name list. By repeating this processing, it will always be possible to eventually change the device name to one that is different from that of another device if the number of names contained in the name list is greater than the total number of communication devices capable of constructing the same short-distance wireless communication network.

Further, with regard to a method of generating the character string added onto the original name, it is possible to use any method that is capable of generating a character string that will not readily duplicate that of another device. For example, a random number generated within the communication device can be converted to a character string.

Further, if all names of which notification has been given by answers to the name querying request have been stored and a name that has been changed using the above-mentioned unique address, name list or random number duplicates a name that has been stored, then the name-change processing is executed repeatedly until duplicate device names no longer exist. If this is carried out, then a changed name that is sure to be different from those of other devices will eventually be obtained.

This embodiment has been described on the assumption that the communication device 104 is incorporated within the printing apparatus 103. However, the arrangement may be one in which the communication device 104 is connected externally as in the manner of the communication device 102.

Further, in this embodiment, the printing apparatus 103 having the internal communication device 104 has been described as a device connected to a short-distance wireless communication network. However, the device connected to the short-distance wireless communication network via an internal communication device or externally connected communication device is not limited to a printing apparatus or computer. Any device may be thus connected, such as a scanner, digital still camera, digital video camera, mobile telephone or PDA.

Further, in this embodiment, an example is described in which three communication devices are connected to the same short-distance wireless communication network and two of the three communication devices have the same name. However, the number of communication devices connected to the same short-distance wireless communication network or the number of communication devices having the same name is not limited to that of this embodiment. In any case, if the name-change processing of FIG. 6 is executed and the name of another communication device agrees with the name of the local communication device, it is possible by changing the name of the local communication device to make this name different from those of communication devices existing on the same short-distance wireless communication network.

Further, this embodiment has been described taking as an example a case where processing for transmitting a query request inquiring as to whether another communication device capable of communicating exists in the vicinity is executed before the name querying request is transmitted. However, a query request need not be issued every time or need not be issued at all. In a case where a query request is not issued, the unique addresses of other communication devices (and the names thereof if necessary) that have transmitted an answer in response to a previously issued query request are stored in the non-volatile memory 207 and the name querying request is transmitted to the stored communication devices.

In this case, if a query request or name querying request has been transmitted from a device not already stored in the non-volatile memory 207, it is preferred that the unique address, etc., of this device be added on. The purpose of this is to cope with devices newly added to the short-distance wireless communication network.

Second Embodiment

A second embodiment of the invention is characterized in that when a name change is made to a communication device incorporated within or connected to an apparatus having a printing function, the changed name is printed. This processing will be described with reference to the flowchart of FIG. 10 taking as an example a case where name-change processing according to this embodiment is executed by the printing apparatus 103-a incorporating the communication device 104-a in the short-distance wireless communication network illustrated in FIG. 1A.

Figure 10:
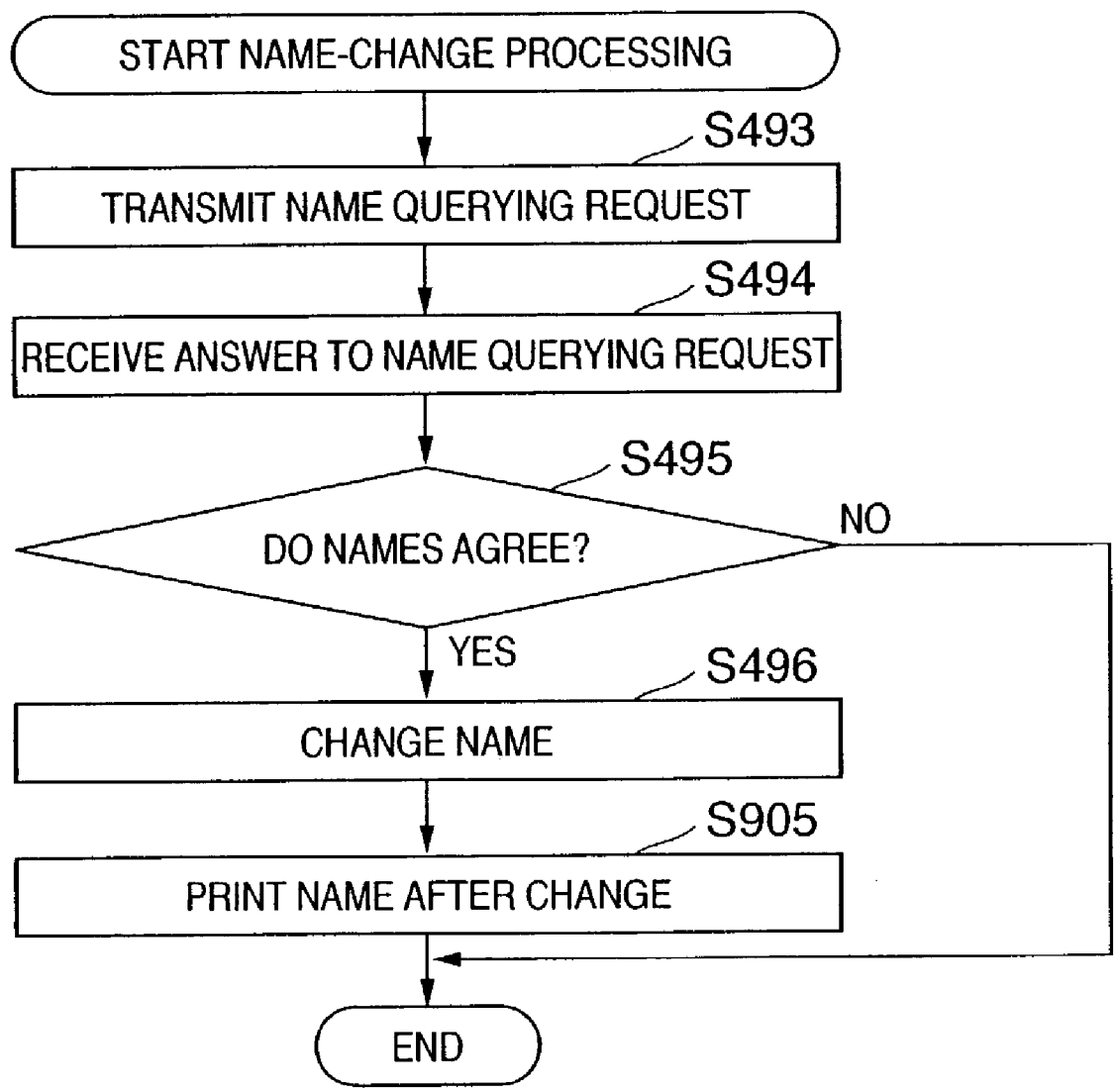
FIG. 10 is a flowchart illustrating name-change processing executed by a communication device according to a second embodiment of the present invention.

The processing program for implementing the processing shown in FIG. 10 has been stored in the ROM 203 within the communication device 104 and is executed by a CPU (not shown) within the controller 201. Processing steps in FIG. 10 that are identical with those of FIG. 4 are designated by like step numbers and need not be described again.

In a case where the communication device 104-a executes name-change processing, processing (steps S491 S492) for transmitting the query request may be executed in a manner similar to that of the first embodiment. Here, however, it is assumed that the device that is to transmit the name querying request is known in advance. Accordingly, processing starts from the transmission of the name querying request at step S493, the communication device 104-a receives an answer in response (step S494), compares the received name of another communication device with its own device name (step S495) and terminates processing if the compared names do not agree. If the names agree, on the other hand, the communication device 104-a changes its own name (step S496) in a manner similar to that of the first embodiment and stores the changed name in the non-volatile memory 207.

The communication device 104-a outputs the changed name using the printing processor 301 (step S905) and terminates processing.

In a case where the name querying request is to be transmitted to a plurality of devices, processing is repeated until the processing of steps S493 to S496 is executed with regard to all of the target devices. If a name change has been made, the communication device 104-a outputs the finally decided name at step S905.

By printing a changed name in this embodiment, the user, especially the user of the printing apparatus 103, can ascertain the fact that the name of the communication device 104 has been changed as well as the changed name without being connected to the short-distance wireless communication network by other equipment. This provides greater convenience.

This embodiment has been described taking as an example a case where the printing processor 301 possessed by the printing apparatus 103 is used as means for reporting a changed name. However, a changed name may be displayed on a display unit, which is ordinarily possessed by a printing apparatus, instead of being printed by the printing processor 301 or in addition to being printed by the printing processor 301.

Further, though an example in which only the changed name is displayed has been described, the name before the change and the name after the change may be printed or displayed so that the user may ascertain both.

Third Embodiment

A communication device according to a third embodiment of the invention will now be described. This embodiment is characterized in that the communication device is provided with a changeover unit for changing over between execution and non-execution of name-change processing.

Figure 11:
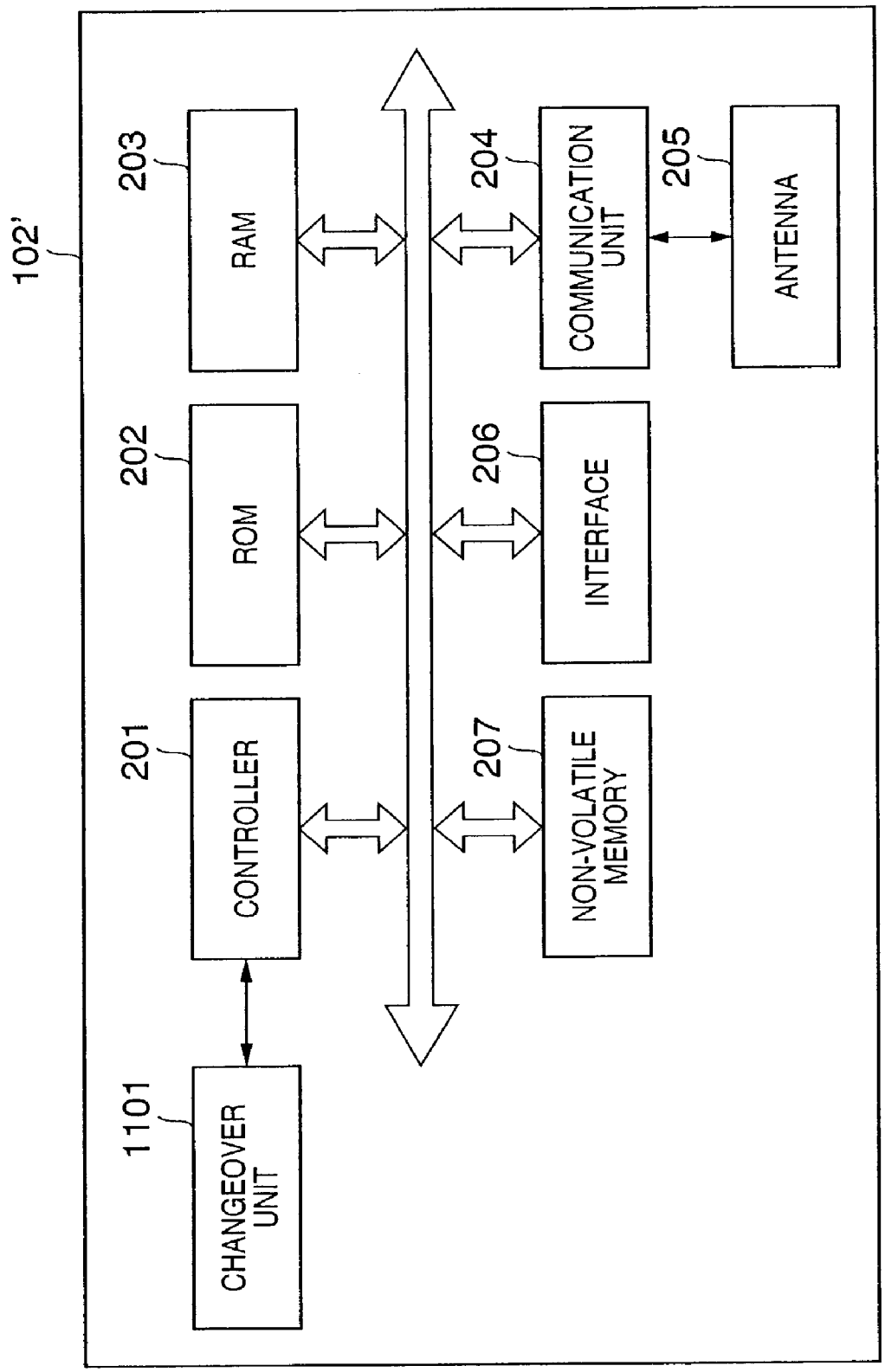
FIG. 11 is a block diagram illustrating an example of the internal structure of a communication device according to a third embodiment of the present invention.

FIG. 11 is a block diagram illustrating an example of the internal structure of a communication device 102' according to this embodiment. Components in FIG. 11 identical with those of FIG. 2 showing the internal structure of the communication device 102 according to the first embodiment are designated by like reference characters. It should be evident from a comparison of FIGS. 2 and 11 that the communication device 102' according to this embodiment has a structure obtained by additionally providing the communication device 102 of FIG. 2 with a changeover unit 1101. A structure similar to that of the communication device 102' is applicable also to the communication device 104 incorporated in a printing apparatus.

A physical switch such as an ON/OFF switch, slide switch or toggle switch may of course be used as the changeover unit 1101, but it is also permissible to use a non-volatile memory capable of storing a value that represents the ON/OFF state in accordance with a switch provided in the communication device 102'. Basically, any means may be used as long as two states can be represented. Further, it is possible to adopt an arrangement in which the setting and changing of the changeover unit 1101 is performed remotely from a device (computer 101, etc.) to which the communication device 102' is connected.

Figure 12:
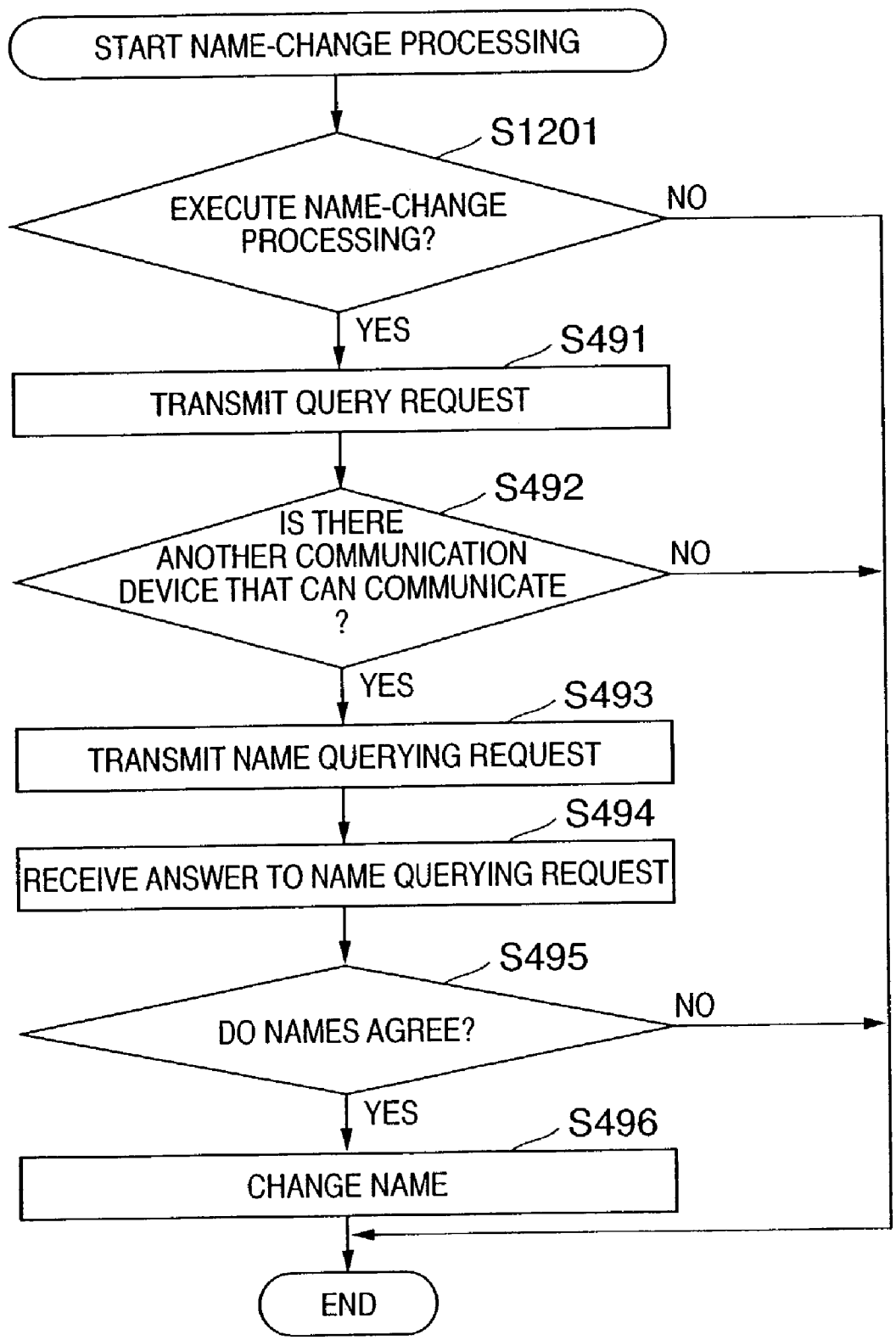
FIG. 12 is a flowchart illustrating name-change processing executed by a communication device according to a third embodiment of the present invention.

FIG. 12 is a flowchart illustrating name-change processing executed by a communication device according to this embodiment.

The communication device 102' checks the value of the changeover unit 1101 before executing name-change processing (step S1201). If the state of the changeover unit 1101 is indicative of name-change processing, then name-change processing (steps S491 to S496) equivalent to that of the first embodiment is executed. If the state of the changeover unit 1101 indicated that name-change processing is not to be executed, on the other hand, then processing is terminated immediately.

In the case of the first and second embodiments, a communication device always queries another communication device with regard to its name when power is introduced or at a predetermined timing, compares the device names and, if the name of the other communication device agrees with the name of the first-mentioned communication device, this communication device changes its name. In accordance with the third embodiment, the user of a communication device is capable of deciding whether name-change processing is to be executed or not. This provides even greater convenience.

Fourth Embodiment

A communication device according to a fourth embodiment of the invention will now be described. In this embodiment, an initializing processing unit for restoring the name of communication device to an initial state is provided.

Figure 13:
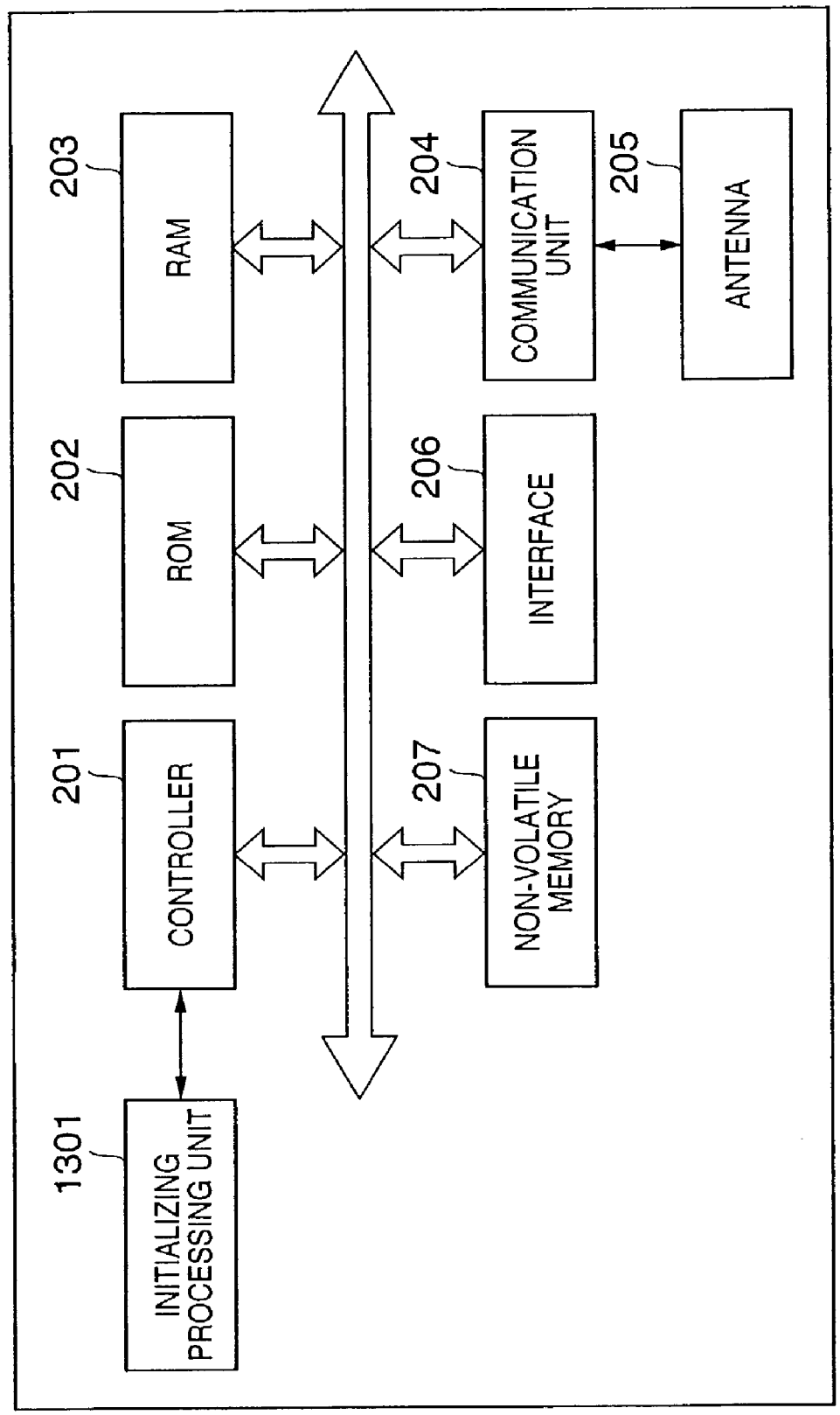
FIG. 13 is a block diagram illustrating an example of the internal structure of a communication device according to a fourth embodiment of the present invention.

FIG. 13 is a block diagram illustrating an example of the internal structure of a communication device 102" according to this embodiment. Components in FIG. 13 identical with those of FIG. 2 showing the internal structure of the communication device 102 according to the first embodiment are designated by like reference characters. It should be evident from a comparison of FIGS. 2 and 13 that the communication device 102" according to this embodiment has a structure obtained by additionally providing the communication device 102 of FIG. 2 with an initializing processing unit 1301. A structure similar to that of the communication device 102" is applicable also to the communication device 104 incorporated in a printing apparatus.

When a name is changed in name-change processing in the communication device 102" of this embodiment, it is necessary that a name that has been stored as an initial value be kept stored and not be erased. Alternatively, a name stored as an initial value may be stored in the ROM 202 and a changed named may be stored in the non-volatile memory 207.

Figure 14:
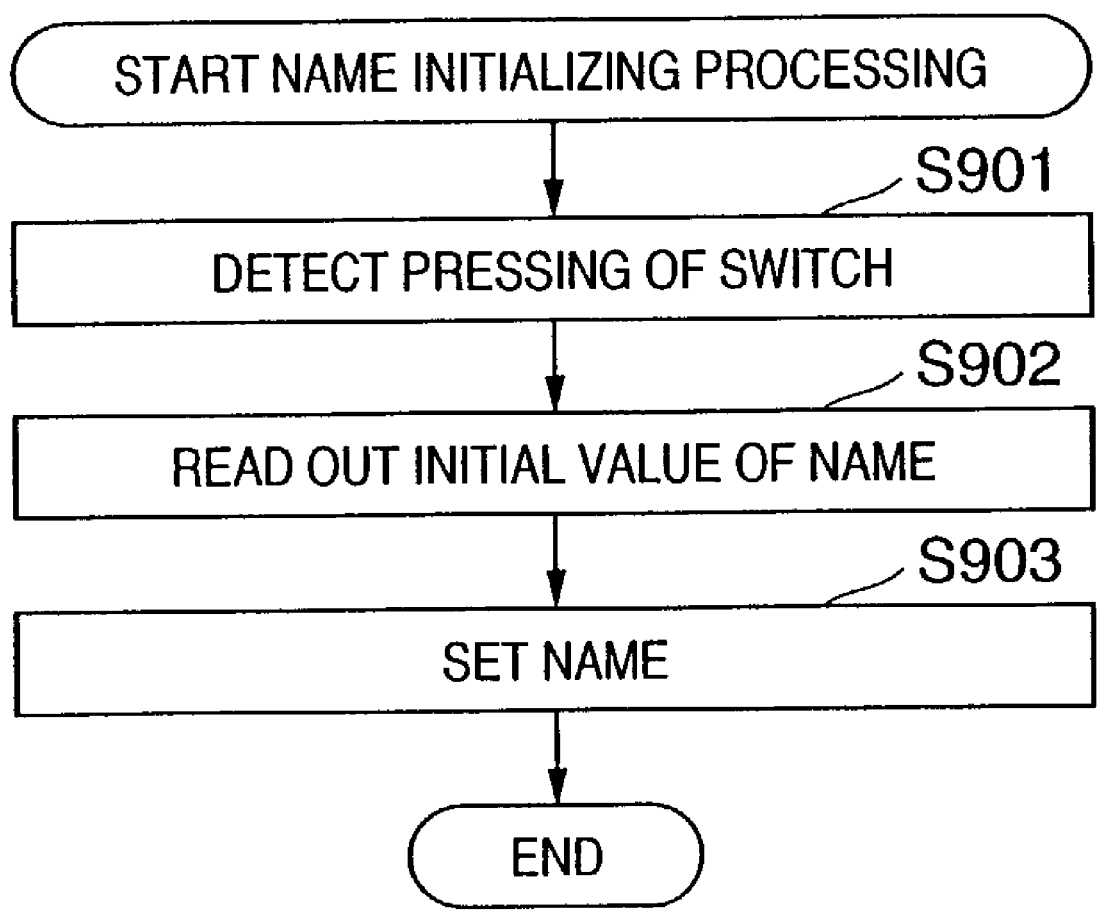
FIG. 14 is a flowchart illustrating name initializing processing executed by a communication device according to the fourth embodiment.

FIG. 14 is a flowchart illustrating name initializing processing in the communication device 102" according to this embodiment. If the communication device detects that the initializing processing unit 1301, which is constituted by a switch, has been pressed (step S901), the communication device reads out the initial value of a name that has been stored in the non-volatile memory 207 or ROM 202 (step S902) and sets the read name as its own name (step S903).

In a case where the initializing processing unit 1301 is constituted by a switch, the unit 1301 may also serve as the changeover unit 1101 shown in FIG. 11. In this case, the changeover unit 1101 uses a switch so adapted that any one of at least three states may be represented, namely a state indicating that name-change processing is to be executed, a state indicating that name-change processing is not to be executed, and a state indicating that the name is to be restored to the initial value.

This embodiment is such that in a communication device whose name has been changed by name-change processing, it is possible for the user to initialize the changed name. This enhances convenience.

It should be noted that the short-distance wireless communication network described in the foregoing embodiments may be implemented by Bluetooth communication or wireless LAN communication such as IEEE 802.11.

The above embodiments have been described taking as an example a short-distance wireless communication network that serves as the communication network using the communication device according to the present invention. However, if a communication network is one having similar issues with regard to the names of devices, a communication device according to the present invention can be applied to any communication network regardless of whether it is wired or wireless and the same effects can be obtained.

Though only a communication device constituted by a single item of equipment has been described in the above embodiments, equivalent functions may be implemented by a system constituted by a plurality of items of equipment.

It should be noted that the present invention also covers a case where software programs for implementing the functions of the above embodiments (programs corresponding to flowcharts illustrated in any one or more of FIGS. 4, 8, 10, 12 and 14 in the above embodiments) are supplied directly from a recording medium, or through use of wired/wireless communication, to a system or apparatus having a computer that is capable of executing the above-mentioned programs, and the system or apparatus executes the supplied programs to thereby implement the equivalent functions.

Accordingly, program code per se supplied to and installed in a computer in order that the computer may execute the processing of the present invention also implements the invention. In other words, the computer program that implements the processing of the present invention also is covered by the present invention.

In this case, so long as the system or apparatus has the functions of the program, the form of the program, e.g., object code, a program executed by an interpreter or script data supplied to an operating system, etc., does not matter.

Examples of recording media by which the program can be supplied are magnetic recording media such as floppy disk, hard disk and magnetic tape, optical/magneto-optical storage media such as a magneto-optical disk, CD-ROM, CD-R, CD-RW, DVD-ROM, DVD-R and DVD-RW, and a non-volatile semiconductor memory.

As for the method of supplying the program using wired/wireless communication, the computer program itself for forming the present invention in the server of a computer network, or a data file (program-data file) that can serve as a computer program for forming the present invention in a client computer, such as a compressed file having an automatic install function, can be stored and the program-data file can be downloaded to a connected client computer. In such case the program-data file can be divided into a plurality of segment files and the segment files can be deployed at different servers.

In other words, the present invention also covers a server apparatus that allows multiple users to download a program-data file for the purpose of implementing the functions of the present invention by computer.

Further, it is also possible to encrypt and store the program of the present invention on a storage medium such as a CD-ROM, distribute the storage medium to users, allow users who meet certain requirements to download decryption key information from, e.g., a website via the Internet, and allow these users to run the encrypted program by using the key information, whereby the program is installed in the user computer.

Furthermore, besides the case where the aforesaid functions according to the embodiments are implemented by executing the read program by computer, an operating system or the like running on the computer can perform all or a part of the actual processing based upon commands in the program so that the functions of the foregoing embodiments are be implemented by this processing.

Furthermore, after the program read from a recording medium is written to a function expansion board inserted into the computer or to a memory provided in a function expansion unit connected to the computer, a CPU or the like mounted on the function expansion board or function expansion unit can perform all or a part of the actual processing based upon commands in the program so that the functions of the foregoing embodiments can be implemented by this processing.

Thus, in accordance with the present invention, as described above, name-change processing can be executed independently in a communication device that adds a network communication function to another apparatus. As a result, all devices that exist on the same network can be designated uniquely by their names. This provides the user with greater convenience.

Further, if a name has been changed, the name after the change is printed and/or displayed, thereby making it possible for the user to readily ascertain that the name of the communication device has been changed as well as the latest name. This provides the user with even greater convenience.

Further, by making it possible to switch between execution and non-execution of name-change processing, it is possible to deal with a case where the user does not wish to change a device name. Thus, convenience is enhanced even further.

In addition, by making it possible to restore a name to an initial value, a name that has been changed can readily be restored to an initial value as desired, thereby enhancing convenience.

Furthermore, the present invention can be applied to a system comprising either a plurality of units or a single unit. It goes without saying that the object of the present invention can be attained by supplying a program that implements the processing defined by the present invention.

As many apparently widely different embodiments of the present invention can be made without departing from the spirit and scope thereof, it is to be understood that the invention is not limited to the specific embodiments thereof except as defined in the appended claims.

What is claimed is:

1. A communication device having a name used on a communication network, comprising:
   name acquisition means for acquiring a name from another communication device;
   comparison means for comparing the name of this communication device with the acquired name of the another communication device;
   change means for changing, in accordance with the result of the comparison, the name of this communication device so that the name of this communication device is different from the name of the another communication device;
   determination means for determining a changed name to be used for this communication device based on results of (a) the name acquisition by said name acquisition means, (b) the name comparison by said comparison means, and (c) the name change by said change means, applied to each of a plurality of another communication devices on the communication network; and
   output means for outputting the changed name determined by said determination means and the unchanged name of this communication device in a comparable manner.

2. The device according to claim 1, wherein said change means generates the changed name by adding a prescribed character string to the original name.

3. The device according to claim 1, wherein said communication device has an address for communication purposes and generates the changed name by using this address.

4. The device according to claim 1, wherein said change means generates the changed name by using a random number.

5. The device according to claim 1, wherein a name is changed by selecting it from previously prepared name candidates.

6. The device according to claim 1, wherein said name acquisition means acquires the name when power is introduced to said communication device and/or at prescribed time intervals.

7. The device according to claim 1, wherein said output means is printing means or display means.

8. The device according to claim 1, further comprising setting means for setting whether or not this communication device is to change its name,
   wherein said change means changes the name in accordance with the setting by said setting means.

9. The device according to claim 1, further comprising instruction means for allowing a user to instruct to restore the changed name to an initial name,
   wherein said change means changes the changed name to the initial name, in response to the instruction via said instruction means.

10. The device according to claim 9, wherein the initial name is provided by the manufacturer of this communication device.

11. An information processing apparatus configured so as to have or be capable of utilizing the communication device set forth in claim 1.

12. A communication network constructed using the communication device set forth in claim 1.

13. A method of controlling a communication device having a name used on a communication network, comprising:
   a name acquisition step of acquiring a name from another communication device;
   a comparison step of comparing the name of this communication device with the acquired name of the another communication device;
   a change step of changing, in accordance with the result of the comparison, the name of this communication device so that the name of this communication device is different from the name of the another communication device;

a determination step of determining a changed name to be used for this communication device based on results of (a) the name acquisition by said name acquisition step, (b) the name comparison by said comparison step, and (c) the name change by said change step, applied to each of a plurality of another communication devices on the communication network; and an output step outputting the changed name determined by said determination step and the unchanged name of this communication device in a comparable manner.

14. A computer program, embodied in a computer-readable medium, for causing a computer to execute the method of controlling a communication device as set forth in claim 13.

15. A communication device having a name used on a communication network, comprising:

a name acquisition unit for acquiring a name from another communication device;

a comparison unit for comparing the name of this communication device with the acquired name of the another communication device;

a change unit for changing, in accordance with the result of the comparison, the name of this communication device so that the name of this communication device is different from the name of the another communication device;

a determination unit for determining a changed name to be used for this communication device based on results of (a) the name acquisition by said name acquisition unit, (b) the name comparison by said comparison unit, and (c) the name change by said change unit, applied to each of a plurality of another communication devices on the communication network; and an output unit for outputting the changed name determined by said determination unit and the unchanged name of this communication device in a comparable manner.

* * * * *

UNITED STATES PATENT AND TRADEMARK OFFICE
CERTIFICATE OF CORRECTION

PATENT NO. : 7,310,690 B2
APPLICATION NO. : 10/405215
DATED : December 18, 2007
INVENTOR(S) : Akane Yokota It is certified that error appears in the above-identified patent and that said Letters Patent is hereby corrected as shown below:

COLUMN 2:
Line 28, "another" should read --other--.

COLUMN 4:
Line 50, "In" should read --It--.

COLUMN 15:
Line 11, "step outputting" should read --step of outputting--.

Signed and Sealed this

Twenty-ninth Day of July, 2008

JON W. DUDAS
*Director of the United States Patent and Trademark Office*